DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 1, 1971

827 O.G. 5

T887,005

CONTROL OF MOLECULAR WEIGHT OF POLY (ETHYLENE TEREPHTHALATE) DURING SOLID PHASE POLYCONDENSATION

Charles J. Kibler, 620 Dogwood Drive 37663; David L. Nealy, 908 Afton St. 37660; and Thomas G. Davis, 1368 Garden Drive, 37664, all of Kingsport, Tenn.

Filed Apr. 2, 1970, Ser. No. 25,270

Int. Cl. C08g *17/03*

U.S. Cl. 260—75

No Drawing. 15 Pages Specification

Process of manufacturing a polyester by initially forming a molten prepolymer from a glycol, such as ethylene glycol and a difunctional compound such as terephthalic acid or a lower dialkyl diester thereof, solidifying the resulting prepolymer, crystallizing the prepolymer, pulverizing the crystallized prepolymer, polymerizing the pulverized prepolymer in a heated fluidized bed in the presence of a continuously introduced stream of preheated inert gas, wherein an improvement resides in maintaining within the fluidized bed a controlled concentration of glycol vapor, whereby the molecular weight of the polymer is caused to attain a predetermined value.